United States Patent [19]

Hatfield

[11] Patent Number: 5,367,549
[45] Date of Patent: Nov. 22, 1994

[54] HEXAGONAL GRID
[75] Inventor: Stephen C. Hatfield, Granby, Conn.
[73] Assignee: Combustion Engineering, Inc., Conn.
[21] Appl. No.: 57,788
[22] Filed: May 6, 1993
[51] Int. Cl.$^5$ ............................................. G21C 3/352
[52] U.S. Cl. .................................. 376/462; 376/442
[58] Field of Search .............. 376/260, 261, 438, 441, 376/442, 462

[56] References Cited

U.S. PATENT DOCUMENTS

| | | | |
|---|---|---|---|
| 3,267,000 | 8/1966 | Ashcroft et al. | 376/442 |
| 3,844,887 | 10/1974 | Georges et al. | 376/442 |
| 4,714,585 | 12/1987 | Kast | 376/442 |

FOREIGN PATENT DOCUMENTS

| | | | |
|---|---|---|---|
| 65613 | 12/1982 | European Pat. Off. | 376/462 |
| 0528621 | 2/1993 | European Pat. Off. | |
| 2532222 | 3/1984 | France . | |
| 3401630 | 7/1985 | Germany . | |
| 4003830 | 8/1990 | Germany . | |
| 2060981 | 5/1981 | United Kingdom . | |
| 93/02456 | 2/1993 | WIPO . | |

OTHER PUBLICATIONS

EP Abstracts: K:Nucleonics; Explosives; Protection, (Week 9126), EP 433-493-A, Jun. 1991.

Primary Examiner—Daniel D. Wasil
Attorney, Agent, or Firm—Ronald P. Kananen; Mulholland, John H.

[57] ABSTRACT

A hexagonal grid is comprised of castled strips which are (a) bent into a zigzag form, and (b) interleaved with one another so that half-height bridge segments, which extend between and are integral with adjacent full-height castle segments, are placed in edge-to-edge contact so that they align with one another. This forms a grid with no double thickness portions. During fabrication the strips are sandwiched between slotted top and bottom plates. These plates are formed with access openings at sites where three segments intersect and through which welding is carried out. Relatively long spring features are only formed in full-height castle segments. The absence of these features in the half-height bridge segments allows the overall height of the grid to be minimized.

2 Claims, 7 Drawing Sheets

FIG. 3
FIG. 4
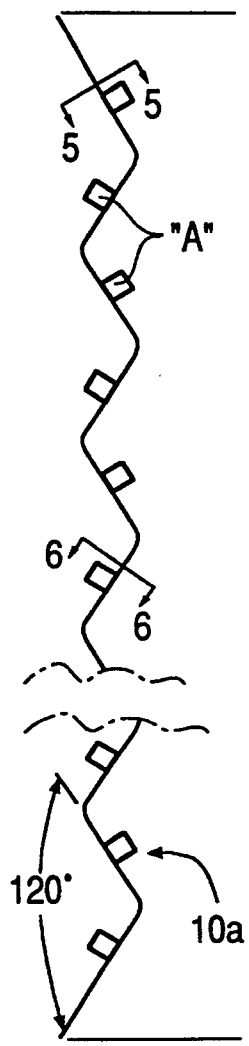
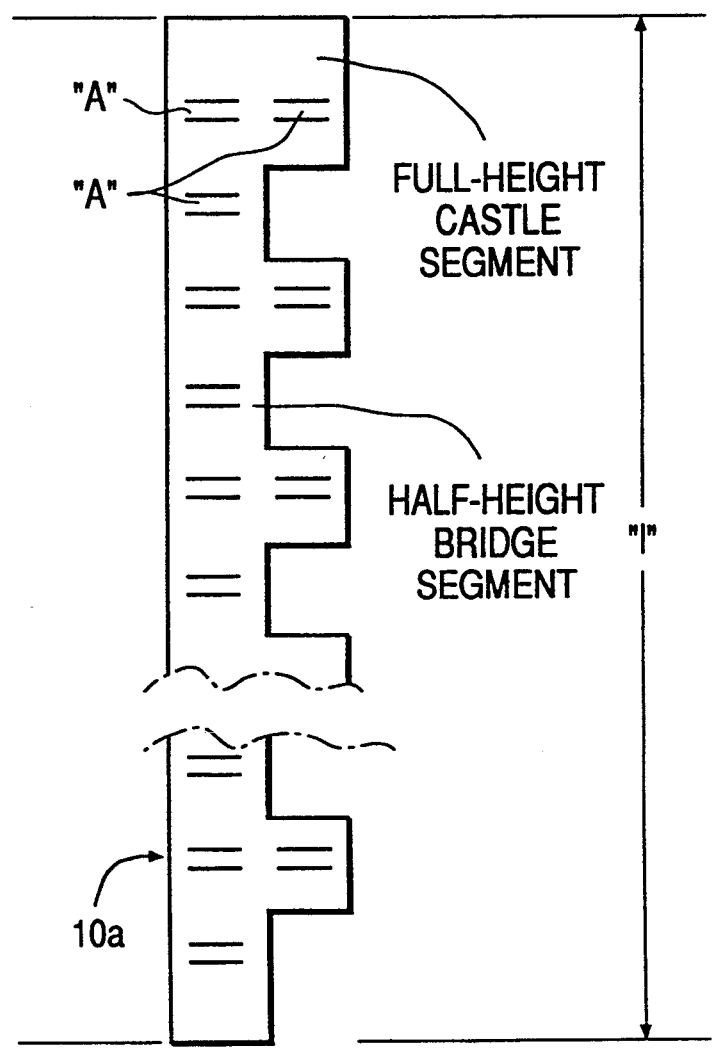
FULL-HEIGHT CASTLE SEGMENT
HALF-HEIGHT BRIDGE SEGMENT
FIG. 5
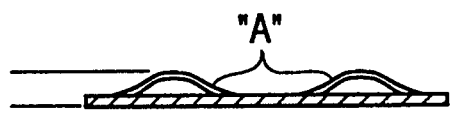
FIG. 6
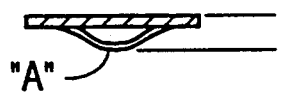

FULL-HEIGHT CASTLE SEGMENT   HALF-HEIGHT BRIDGE SEGMENT

HEXAGONAL GRID

BACKGROUND OF THE INVENTION

1. Field of the Invention

This invention relates generally to a nuclear fuel assembly spacer grid for use in fuel assemblies utilizing a hexagonal cross-section. More specifically, this invention relates to a grid which features a design and a fabrication technique which enables a low cost and a potentially low pressure drop alternative to the existing designs.

2. Description of the Related Art

Six-sided fuel assemblies are used in various reactor core designs, especially in Europe and Asia. One possible fabrication technique resides in brazing individual hexagon-shaped tubular components together to form the overall structure. The fuel rod contact features are created prior to final assembly by piercing and forming portions of selected tube walls, such that these portions project inwardly toward the rod. In some designs, certain of the hexagonal components are eliminated in special assembly locations which will later contain cylindrical members, or thimbles, to guide control rods and form the longitudinal structure of the fuel assembly.

Drawbacks to this type of design reside in the fact that many individual components are required to form the grid, and that various fabrication problems associated with the brazing process, most notably its incompatibility with low neutron capture zirconium alloys, are encountered. Moreover, the double wall thickness which inherently occurs between each pair of fuel rods induces a relatively high pressure drop.

SUMMARY OF THE INVENTION

It is an overall general object of the present invention to provide a grid arrangement which can be easily fabricated, is formed of simply shaped members, and which reduces pressure drop by avoiding the formation of double wall thicknesses.

In brief, the above object is achieved by an arrangement wherein castled strips are bent into a zigzag form, and then interleaved with one another so that half-height "bridge" segments, which extend between adjacent full-height "castle" segments, are placed in edge-to-edge contact and arranged so that they align with one another. This forms a grid with no double thickness portions. During fabrication the strips are sandwiched between top and bottom slotted plates. These plates are formed with access openings at sites where three segments intersect and through which welding is carried out. Relatively long spring features are only formed in full-height castle segments. The absence of these features in the half-height bridge segments allows the overall height of the grid to be minimized.

More specifically a first aspect of the present invention resides in a hexagonal grid which features: a plurality of first castled strips, the first strips being bent into a zigzag shape and arranged parallel to one another with the castling projections extending in a first direction; and a plurality of second castled strips, the second strips being bent into a zigzag shape and arranged parallel to one another with the castling projections extending in a second direction opposite to the first direction, the second strips being interleaved with the first strips and arranged with respect to the first strips such that first edge portions which extend, generally horizontally, between adjacent castle segments of the first strip are located in a face-to-face relationship with second edge portions which extend between adjacent castle segments of the second strip.

A second aspect of the present invention resides in a hexagonal grid which features: first, second, third and fourth sets of strips which are each composed of a plurality of strips. Each of the strips of each set is such that each strip (a) is formed with alternately arranged full-height and half-height segments, (b) is bent to have a zig-zag configuration wherein each of the full-height segments is angled at a predetermined angle with respect to an adjacent half-height segment, and (c) is formed with edges which each extend horizontally along a half-height segment and between adjacent full-height segments. Additionally, the grid is arranged such that the first, second, third and fourth sets of strips are interleaved with one another so that each edge of each strip which composes the first and second sets of strips is disposed against an edge of the strips which compose the third and fourth sets of strips, and so that pairs of half-height segments are aligned in a manner which essentially forms a full-height wall portion.

Another aspect of the present invention resides in a method of fabricating a hexagonal grid which features the steps of: forming a plurality of first strips which have alternate full-height and half-height segments; bending the first strips so that each full-height segment is angled with respect to an adjacent half-height segment and arranging the first strips so that they are parallel to one another and so that the castle-like portions which project above the half-height segments, extend in a first direction; forming a plurality of second strips which have alternate full-height and half-height segments; bending the second strips so that each full-height segment is angled with respect to an adjacent half-height segment and arranging the second strips so that they are parallel to one another and so that the castle-like portions which project above the half-height segments, extend in a second direction which is opposite the first direction; and overlying the second strips on the first strips so that pairs of half-height portions of the first and second strips are vertically aligned with one another.

Yet another aspect of the present invention resides in a method of fabricating a hexagonal grid comprising the steps of: forming a base plate with first, second and third sets of parallel grooves therein; forming first access openings in predetermined locations in the base plate; forming a top plate with first, second and third sets of parallel grooves which correspond to the first, second and third sets of parallel grooves formed in the base plate; forming second access openings in predetermined locations in the top plate; forming a plurality of first strips so that each of the first strips has alternate full-height and half-height segments, so that each first strip has a base edge which is common to all full-height and half-height segments, so that the first strips each have second castle-like portions defined by portions of the full-height segments which project above the half-height segments and so that the full-height segments each have a top edge; bending the first strips so that each full-height segment is angled with respect to an adjacent half-height segment; forming a plurality of second strips so that each of the second strips has alternate full-height and half-height segments, so that each second strip has a base edge which is common to all full-height and half-height segments, so that the second strips each have second castle-like portions defined by portions of the full-height segments which project above the half-height segments and so that each full-height segment has a top edge; bending the second strips so that each full-height segment is angled with respect to an adjacent half-height segment; setting the base edges of the first strips in the grooves formed the base plate; overlaying the second strips on the first set of strips so that top edges of the full height segments engage in grooves which are still vacant in the base plate after the placement of the first strips; placing the top plate over the first and second strips so that the base edges of the second strips and the top edges of the full height segments of the first strips are received in the grooves formed in the top plate; and welding the first and second strips through the first and second access openings.

BRIEF DESCRIPTION OF THE DRAWINGS

The various features and advantages of the present invention will become more clearly appreciated as discussion of the preferred embodiments is made with reference to the appended drawings in which:

FIGS. 3 and 4 are respectively plan and elevational views showing the constructional features of a first set of strips used in the construction of the grid shown in FIG. 1;

FIGS. 5 and 6 are sectional views as taken respectively along section lines 5—5 and 6—6 of FIG. 3;

DESCRIPTION OF THE PREFERRED EMBODIMENTS

Figure 1:
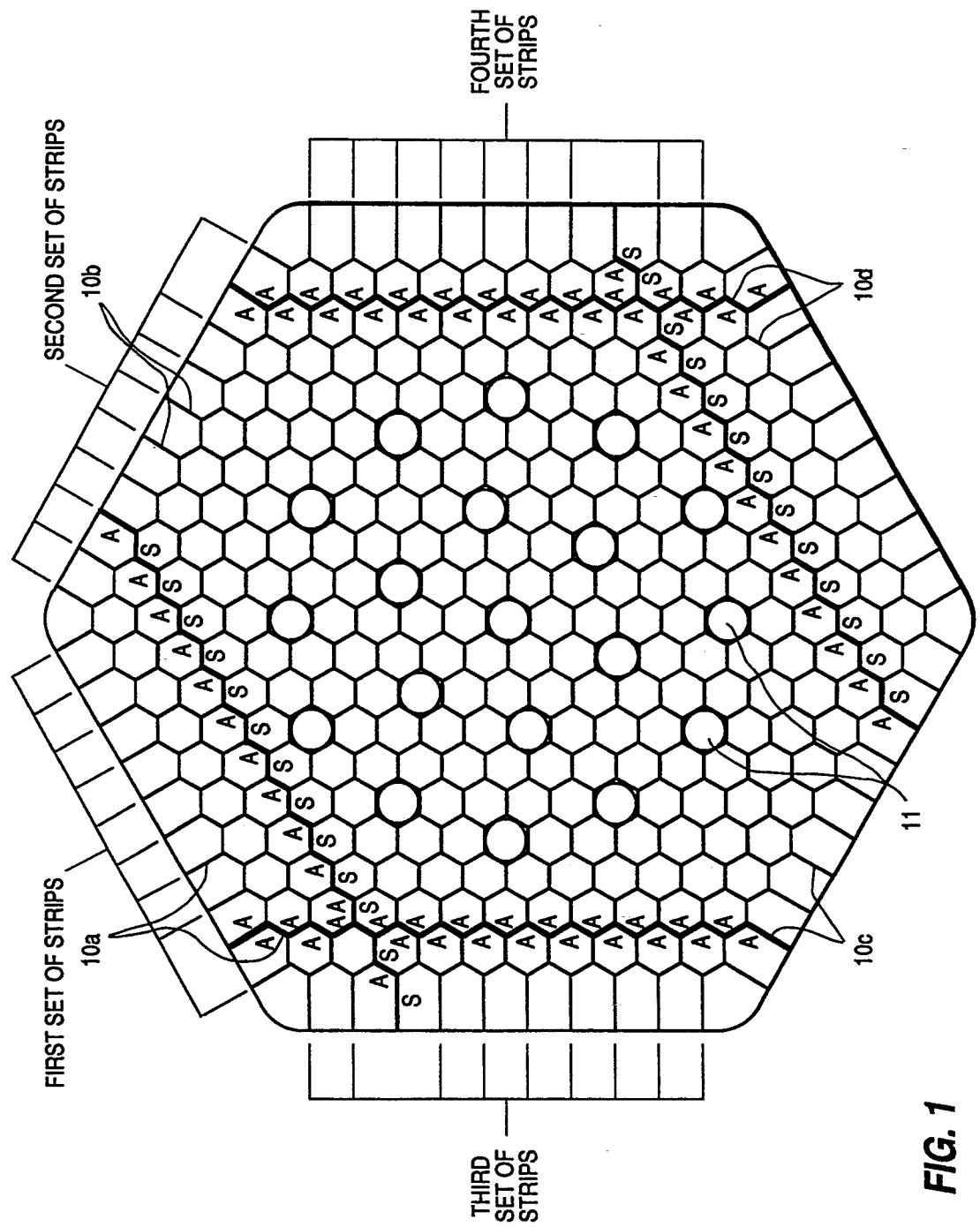
FIG. 1 is a cross-sectional plan view showing a hexagonal spacer grid according to a preferred embodiment of the present invention.

FIG. 1 is a plan view of the spacer grid according to a preferred embodiment of the present invention. In this instance, the grid can be considered as being composed of four sets of inner strips (10a, 10b, 10c and 10d). The first and second strip sets, (10a) and (10b), are shown as extending parallel to the North-South extending sides of the hexagon (as seen in the figure) on the figure, while the third and fourth sets, 10c and 10d, extend in a direction which is parallel to the North-East extending sides (as seen in the figure). It will be noted examples of the first to fourth strip sets (10a-10d) have been bolded merely for the sake of explanation and to indicate the manner in which they are arranged in the grid.

Typical guide thimble locations (11) are also shown on FIG. 1. The thimbles can pass directly past the walls of the inner strips.

The strips (10a-10d) which comprise the grid are formed with arch and spring features. These are respectively designated "A" and "S" in the figures. The arch members or features "A" are shorter and more rigid than the longer slightly more flexible spring features "S". FIGS. 3 to 13 show construction details of the strips which are used in the four sets (10a-10d) used to construct the inventive grid. As will be appreciated from these figures, the strips 10a, 10b which are used in the first and second sets are basically the same as one another and differ only in the end or terminal portions. The strips 10c, 10d which are used in the third and fourth sets are also essentially the same as one another and again differ only in the configuration of the terminal portions.

As will be noted, the first "type" of strip which is used in the first and second strip sets, is provided with only arch features "A". As will be appreciated from FIGS. 5 and 6, there are two arch features "A" formed on each of what shall be referred to as full-height "castle" segments and only one arch feature "A" formed in each of what shall be referred to as half-height "bridge" segments. The arch features formed in the half-height bridge segments are arranged to project in a direction opposite to those formed in the full-height castle segments. This ensures that each hexagonal grid cell has the same number of arch features (four in the illustrated embodiment) projecting thereinto.

The second "type" of strip which is used in the third and fourth sets 10c, 10d (FIGS. 9 to 12), features a single arch feature in each bridge segment and a spring feature in each castle segment. FIG. 13 shows an example of a spring feature "S". This feature has a wavy or corrugated profile wherein the central peak tends to be higher than the other two.

In these second type of strips the spring features "S" are all arranged to project in the same direction.

When the grid is assembled, the first and second strip sets 10a, 10b are arranged with the full-height castle segments oriented in a first direction (e.g. upwardly). The second and third sets of strips 10c, 10d are placed over the first and second ones so that the half-height castle segments are oriented in a second (opposite) direction (e.g. downwardly). This places the edges which extend horizontally between adjacent castle segments, in a face to face relationship and so that the bridge segments abut to define surfaces which are essentially equal in area to the castle segments. Accordingly, the grid assembly according to the present invention does not have any double thickness sections and therefore minimizes pressure drop in the fluid flowing therethrough.

In the instant embodiment, the arch features which are formed in the abutting bridge segments are arranged to project in the same direction within a given hexagonal cell when the grid is assembled.

Figure 10:
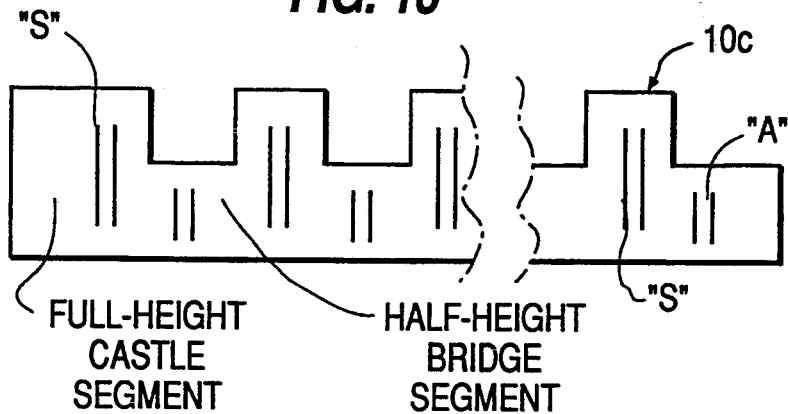
Figure 11:
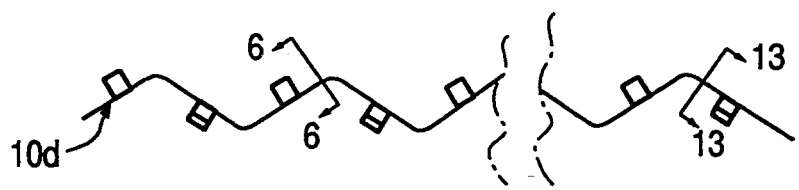
FIGS. 11 and 12 are respectively plan and elevational views showing the constructional features which characterize a fourth set of strips used in the preferred embodiment of the present invention.
Figure 12:
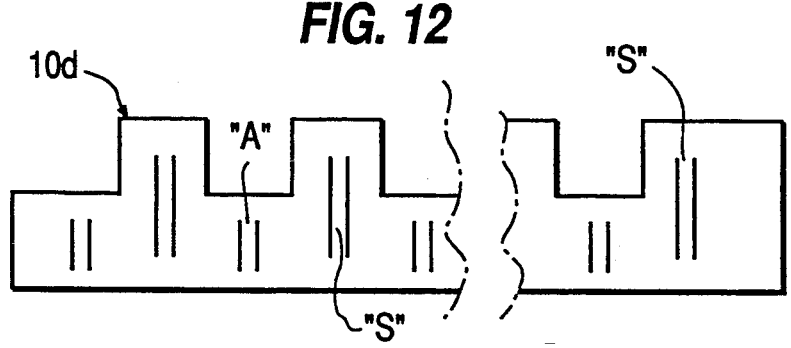
Figure 13:
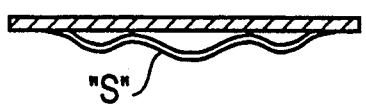
FIG. 13 is a cross-sectional view of a spring feature as taken along section line 13—13 of FIGS. 9 and 11.

Additionally it should be noted that, as is apparent from FIGS. 10 and 12 for example, the first and second and third and fourth strip sets are arranged such that the full-height castle segments are arranged to occur in alternate locations along the two pairs of strips. In this sense there is a difference between the first and second and between the third and fourth strip sets, even though the dimensions of the strips are essentially the same along the major part of their respective lengths.

The illustrated embodiment is such that the height of the bridge segments is half that of the castle segments so as to enable a flat grid to be achieved. However, the present invention is not limited to these type of dimensions and it is within the scope of the invention to arrange for the castle segments on the first and second strip sets (for example) to be made longer and to bend the top edges to induce flow direction deflection (Viz., provide a mixing feature) if so desired.

Each rod is supported by the spring and arch features as in the conventional design at three axes located approximately 120 degrees apart. However, the invention offers the added stability in grid arrangements wherein it is possible for one spacer grid to be rotated with respect to the one next to it in the fuel assembly, thus placing the more resilient feature(s) "S" in contact with a different side of the rod. Note that inversion of the grid is not a requirement to obtain this benefit, just rotation. This is important in case a mixing feature is added to the upper side of the design.

A further feature of the grid is that no one segment (bridge or castle segment) contains both a spring "S" and an arch "A" feature. This absence, as different from a typical PWR design using a square grid (wherein both "S" and "A" features would be required), enables the overall height of the grid to be minimized.

The strip designs are very simple, and although many different lengths "l" (see FIG. 4) are required in each of the four strip sets in order to form the full grid, the central segments of each differ only in the number of segments and in the requirement that springs and arches are not formed adjacent to thimble locations, so the design lends itself well to a computer controlled progressive stamping system to produce these varieties inexpensively.

The half-height bridge section located between each castle segment is an important feature of the present invention and permits the grid to be assembled from continuous strips, yet have no double thickness portions between rods.

Figure 2:
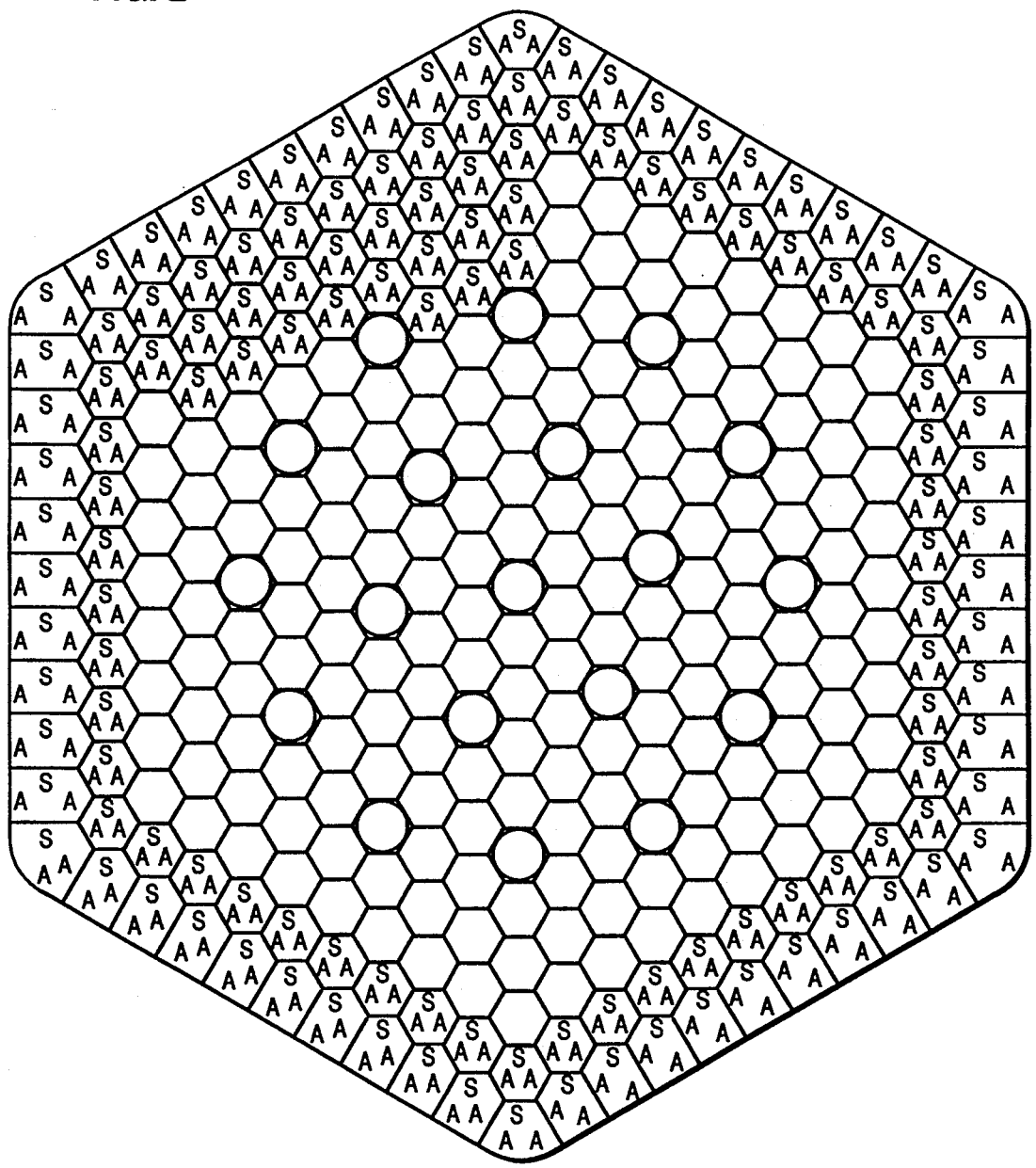
FIG. 2 is a cross-sectional plan view of the arrangement depicted in FIG. 1 showing an arch and spring disposition pattern which occurs with the preferred embodiment.
Figure 7:
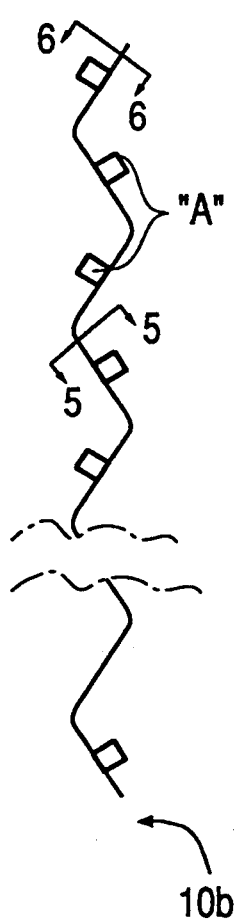
FIGS. 7 and 8 are respectively plan and elevational views showing the constructional features of a second set of strips used in the preferred embodiment of the invention.
Figure 8:
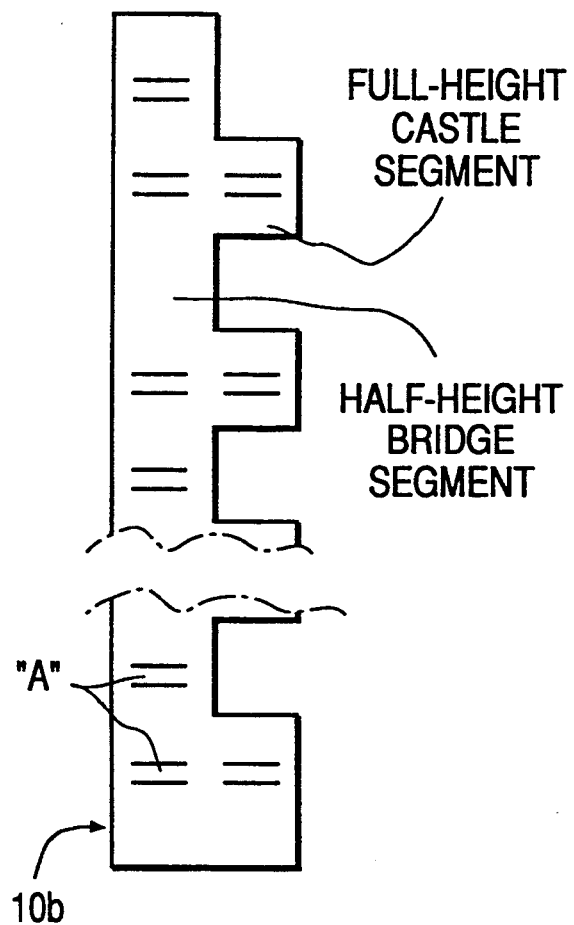
Figure 9:
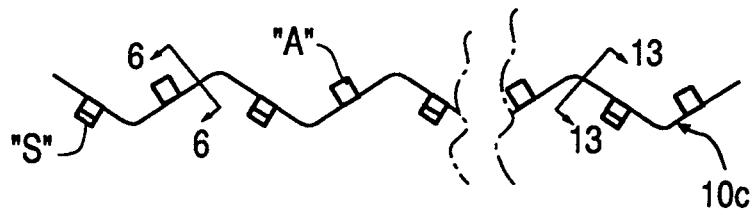
FIGS. 9 and 10 are respectively plan and elevational views showing the constructional features of a third set of strips used in the preferred embodiment of the invention.

With the "S" and "A" arrangement shown in FIG. 2, none of the half-height sections is required to contain the more resilient rod contact "S" feature. Since this feature occupies more height than the stiffer "A" feature, grid height (and pressure drop) is again minimized because the feature can be located exclusively in the full height sections of strips.

It should be noted that arches or springs would not be formed at the thimble locations.

Fabrication

Figure 14:
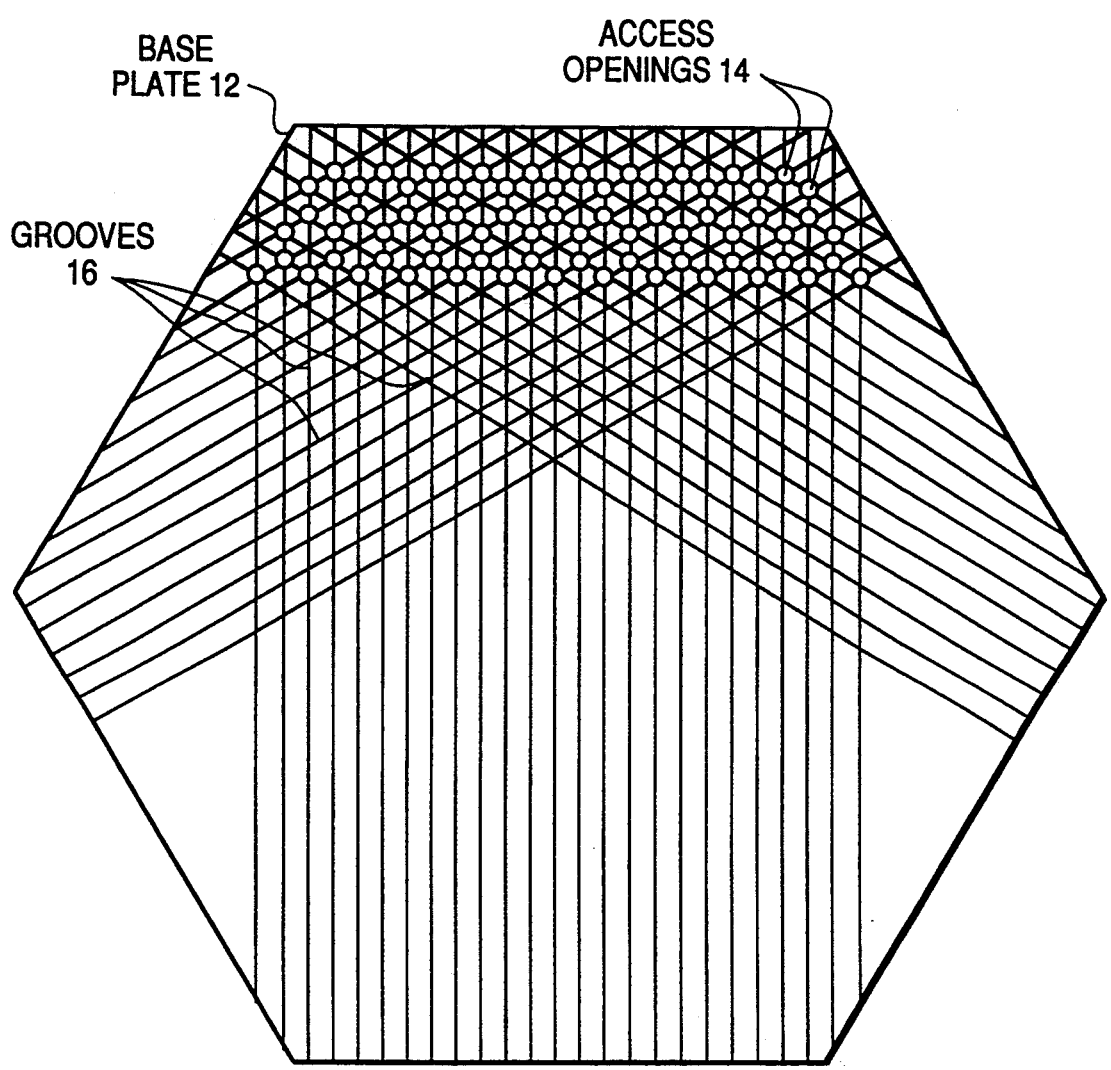
FIG. 14 is a plan view showing a base plate which is used during the fabrication of grids according to the present invention.

The technique used to fabricate the grid is novel. FIG. 14 shows a base plate 12 which is formed by first machining the basic hexagonal shape, then drilling access openings 14 at each location where three strip segments will intersect, and finally machining three series of grooves 16 with each series perpendicular to two opposite sides of the plate.

Grid strips 10a–10d can be secured in the required positions necessary for welding by first placing the base plate 12 on a work surface in the orientation shown in the figure. Following this, strip sets 1 and 2 (viz., strips 10a and 10b) are placed into, and held in position by the appropriate slots. Next, strip sets 3 and 4 (viz., strips 10c and 10d) are placed over strip sets 1 and 2 with their full height or castle segments extending down into previously unused grooves in the base plate 12.

Following this, an upper plate, which is the mirror image of the base plate, is placed over the assembly in a manner which engages the upper edges of the assembly of strips. This secures the grid in position ready for welding.

Figure 15:
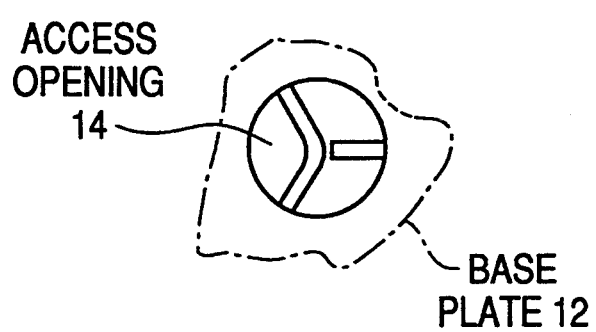
FIGS. 15 and 16 are respectively plan views showing sites which are welded together as seen through access openings formed in the base plate shown in FIG. 14, before and after welding, respectively.
Figure 16:
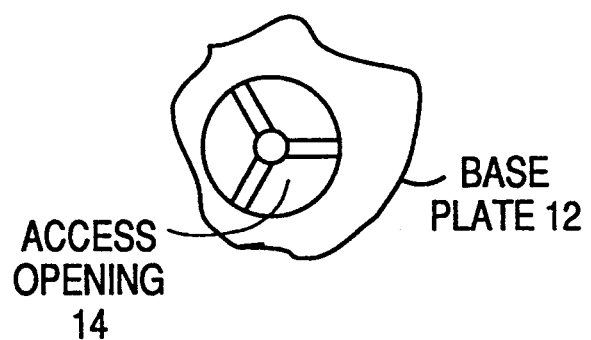

Each intersection between (a) an edge which extends vertically along one side of a castle segment and (b) an angled edge defined by a bend which endows the zigzag shape on the strips, is then accessible through the access openings 14 in the manner depicted in FIG. 15. Under these conditions welding is carried out through the access openings in a manner which results in the situation illustrated in FIG. 16.

Alternative Arrangements

It is within the scope of the present invention to use a different mixture of the first and second types of strips if so desired. For example, a mixture of three of the first type and one of the second, or vice versa is possible if such would serve a desired purpose. Alternatively, all could be formed of the second type or all of the first type in the event that this would provide required characteristics.

The number or width of spring and arch elements can be varied to control the rigidity of the system. For example, two relatively narrow spring features can be formed side by side and so on.

The various possibilities which can be made to the above described strip arrangements in order to vary/improve the various characteristics of the grid will be obvious to those skilled in the art to which the instant invention pertains.

The manner in which the invention leads itself to computer controlled or NC type production techniques in order to stamp out the varying lengths of the strips which are used, will also be self evident in view of the forgoing disclosure.

What is claimed is

1. A hexagonal grid comprising:
   a plurality of first castled strips, said first strips having castling along only a first edge and an essentially smooth opposite second edge, said first strips being bent into a zigzag shape and arranged parallel to one another with the castling projections extending in a first direction; and
   a plurality of second castled strips, said second strips having castling along only one edge and an essentially smooth opposite second edge, said second strips being bent into a zigzag shape and arranged parallel to one another with the castling projections extending in a second direction opposite said first direction, said second strips being interleaved with said first strips and arranged such that first edge portions which extend between adjacent castle segments of said first strip are located in an abutting face-to-face relationship with second edge portions which extend between adjacent castle segments of said second strip and so that overlap between said first and second strips which forms a double thickness portion, is totally absent,
   said first strip including a plurality of relatively rigid arch features, and said second strip including a plurality of relatively rigid arch features and a plurality of relatively resilient spring features, said relatively resilient spring features each being elongate and about twice as long as said relatively rigid arch features and each arranged to extend along a castled portion of each of said second strips, said relatively resilient spring features each having first and second ends which are rigidly connected to the strip in which the spring feature is formed, said first and second strips being arranged with respect to one another to form a plurality of hexagonal cells.

2. A hexagonal grid comprising:

a plurality of first castled strips, said first strips having castling along only a first edge and an essentially smooth opposite second edge, said first strips being bent into a zigzag shape and arranged parallel to one another with the castling projections extending in a first direction; and a plurality of second castled strips, said second strips having castling along only one edge and an essentially smooth opposite second edge, said second strips being bent into a zigzag shape and arranged parallel to one another with the castling projections extending in a second direction opposite said first direction, said second strips being interleaved with said first strips and arranged such that first edge portions which extend between adjacent castle segments of said first strip are located in an abutting face-to-face relationship with second edge portions which extend between adjacent castle segments of said second strip and so that overlap between said first and second strips which forms a double thickness portion, is totally absent, at least one of said first and second strips containing a plurality of relatively resilient spring features, said relatively resilient spring features each having first and second ends which are both rigidly connected to the one of said first and second strips in which the feature is formed.

* * * * *